United States Patent
Anderson et al.

(10) Patent No.: US 8,961,141 B2
(45) Date of Patent: Feb. 24, 2015

(54) AXIAL RETENTION SYSTEM FOR A BLADED ROTOR WITH MULTIPLE BLADE TYPES

(75) Inventors: Carney R. Anderson, East Haddam, CT (US); Peter V. Tomeo, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 704 days.

(21) Appl. No.: 13/220,656

(22) Filed: Aug. 29, 2011

(65) Prior Publication Data

US 2013/0052026 A1 Feb. 28, 2013

(51) Int. Cl.
*F01D 5/32* (2006.01)

(52) U.S. Cl.
CPC ............... *F01D 5/326* (2013.01); *Y02T 50/672* (2013.01)
USPC ...................................... 416/203; 416/220 R

(58) Field of Classification Search
CPC .......... F01D 5/326; F01D 5/323; F01D 5/32; F01D 5/3007; F01D 5/3015
USPC ...................... 29/889, 889.21, 889.22, 889.3; 416/219 R, 220 R, 222, 221, 203
See application file for complete search history.

(56) References Cited

U.S. PATENT DOCUMENTS

| | | | |
|---|---|---|---|
| 3,397,865 A | 8/1968 | Catlow et al. | |
| 4,221,542 A * | 9/1980 | Acres et al. | 416/220 R |
| 5,443,366 A | 8/1995 | Knott et al. | |
| 5,522,702 A | 6/1996 | Kemsley et al. | |
| 6,416,280 B1 | 7/2002 | Forrester et al. | |
| 6,457,942 B1 | 10/2002 | Forrester | |
| 6,481,971 B1 | 11/2002 | Forrester | |
| 6,520,742 B1 | 2/2003 | Forrester et al. | |
| 6,634,863 B1 | 10/2003 | Forrester et al. | |
| 6,739,837 B2 | 5/2004 | Barnette et al. | |
| 6,846,159 B2 | 1/2005 | Zabawa et al. | |
| 6,951,448 B2 | 10/2005 | Duesler et al. | |
| 7,153,098 B2 | 12/2006 | Zabawa | |
| 7,201,558 B2 | 4/2007 | Norris et al. | |
| 7,507,075 B2 | 3/2009 | Kang et al. | |
| 7,566,201 B2 | 7/2009 | Brillert et al. | |
| 7,927,075 B2 | 4/2011 | Suciu et al. | |
| 2008/0050245 A1 | 2/2008 | Cloarec | |

FOREIGN PATENT DOCUMENTS

| | | |
|---|---|---|
| FR | 2524933 | 10/1983 |
| GB | 2258273 | 8/1991 |
| GB | 739870 | 11/1995 |

OTHER PUBLICATIONS

European Search Report completed Dec. 14, 2012 for European Patent Application No. 12182029.4.

* cited by examiner

*Primary Examiner* — Edward Look
*Assistant Examiner* — Juan G Flores
(74) *Attorney, Agent, or Firm* — Carlson, Gaskey & Olds, P.C.

(57) ABSTRACT

A bladed rotor includes a blade lock mountable to a rotor hub adjacent to a multiple of blade slots. The blade lock includes at least one interface feature adjacent to a first of the multiple of blade slots. A first rotor blade includes a blade feature which interfaces with the interface feature to permit the first rotor blade to be axially mounted within the first of the multiple of blade slots but not within a remainder of the multiple of blade slots.

24 Claims, 7 Drawing Sheets

AXIAL RETENTION SYSTEM FOR A BLADED ROTOR WITH MULTIPLE BLADE TYPES

BACKGROUND

The present disclosure relates to an axial retention system for a bladed rotor, particularly a fan rotor of a gas turbine engine.

A fan rotor of the type used in an aircraft gas turbine engine includes a hub which rotates about a rotational axis and an array of blades which extend radially from the hub. The hub includes a series of circumferentially distributed peripheral slots. Each slot extends in a predominantly axial direction. Each slot is typically open at either a forward section of the hub, an aft section of the hub, or both to facilitate axial installation and removal of the blades. An axial retention system prevents the installed blades from migrating axially out of the slots.

SUMMARY

A bladed rotor according to an exemplary aspect of the present disclosure includes a blade lock mountable to a rotor hub adjacent to a multiple of blade slots. The blade lock includes at least one interface feature adjacent to a first of the multiple of blade slots. A first rotor blade includes a blade feature which interfaces with the interface feature to permit the first rotor blade to be axially mounted within the first of the multiple of blade slots but not within a remainder of the multiple of blade slots.

A bladed rotor according to an exemplary aspect of the present disclosure include a rotor hub which defines a multiple of first blade slots and a multiple of second blade slots. A blade lock is mountable to the rotor hub adjacent to the multiple of first and second blade slots, the blade lock includes a multiple of first interface features each adjacent to one of the multiple of first blade slots. A multiple of first rotor blades with a blade feature which interfaces with the interface feature to permit the multiple of first rotor blades to be axially mounted within the multiple of first blade slots but not within the multiple of second blade slots.

A method of assembling a bladed rotor according to an exemplary aspect of the present disclosure includes permitting a first rotor blade to be axially mounted within a first of a multiple of blade slots by a blade lock but not within a remainder of the multiple of blade slots by the blade lock.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
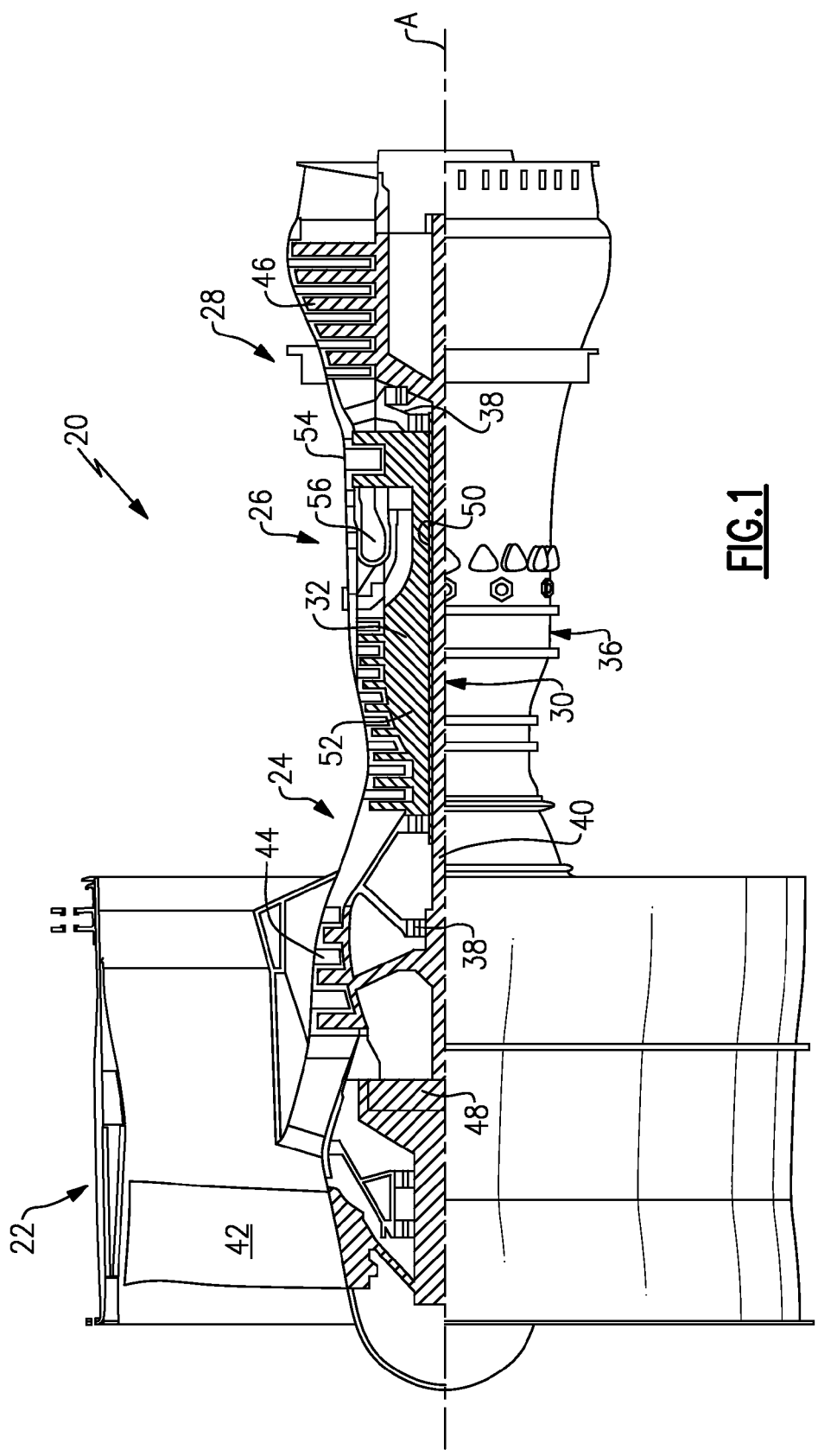
FIG. 1 is a schematic cross-section of a gas turbine engine.

FIG. 1 schematically illustrates a gas turbine engine 20. The gas turbine engine 20 is disclosed herein as a turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 54, 46 rotationally drive the respective low speed spool 30 and high speed spool 32 in response to the expansion.

Figure 2:
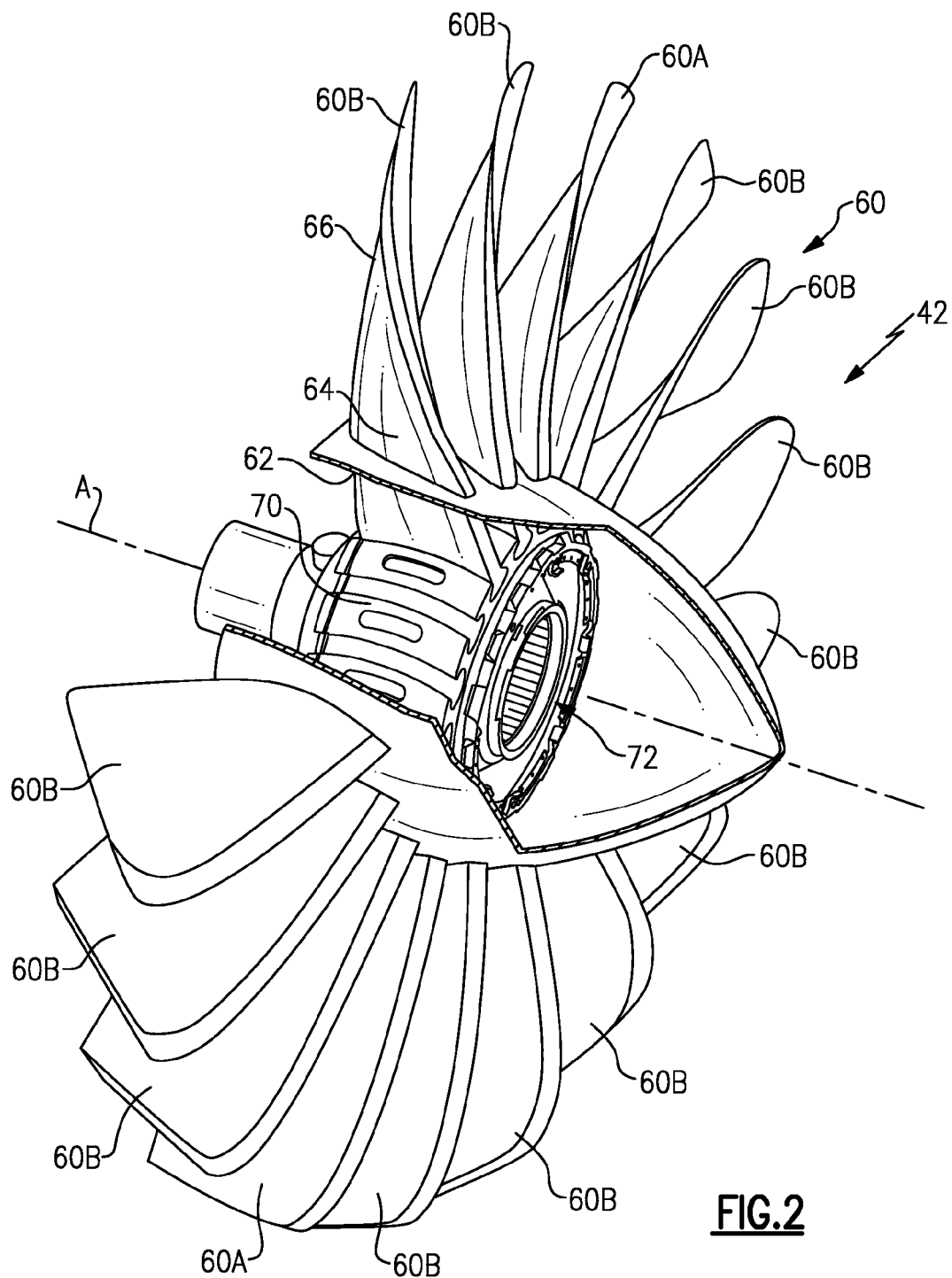
FIG. 2 is an enlarged perspective partial sectional view of a fan section.

With reference to FIG. 2, the fan 42 includes a plurality of circumferentially spaced fan blades 60 which may be manufactured of a high-strength, low weight material such as an aluminum alloy, titanium alloy, composite, or combinations thereof. It should be understood that although a single fan stage is illustrated and described in the disclosed embodiment, additional stages as well as other bladed rotor with other blades that are received with an axial interface inclusive of fan blades, compressor blades and turbine blades will also benefit herefrom.

Figure 3:
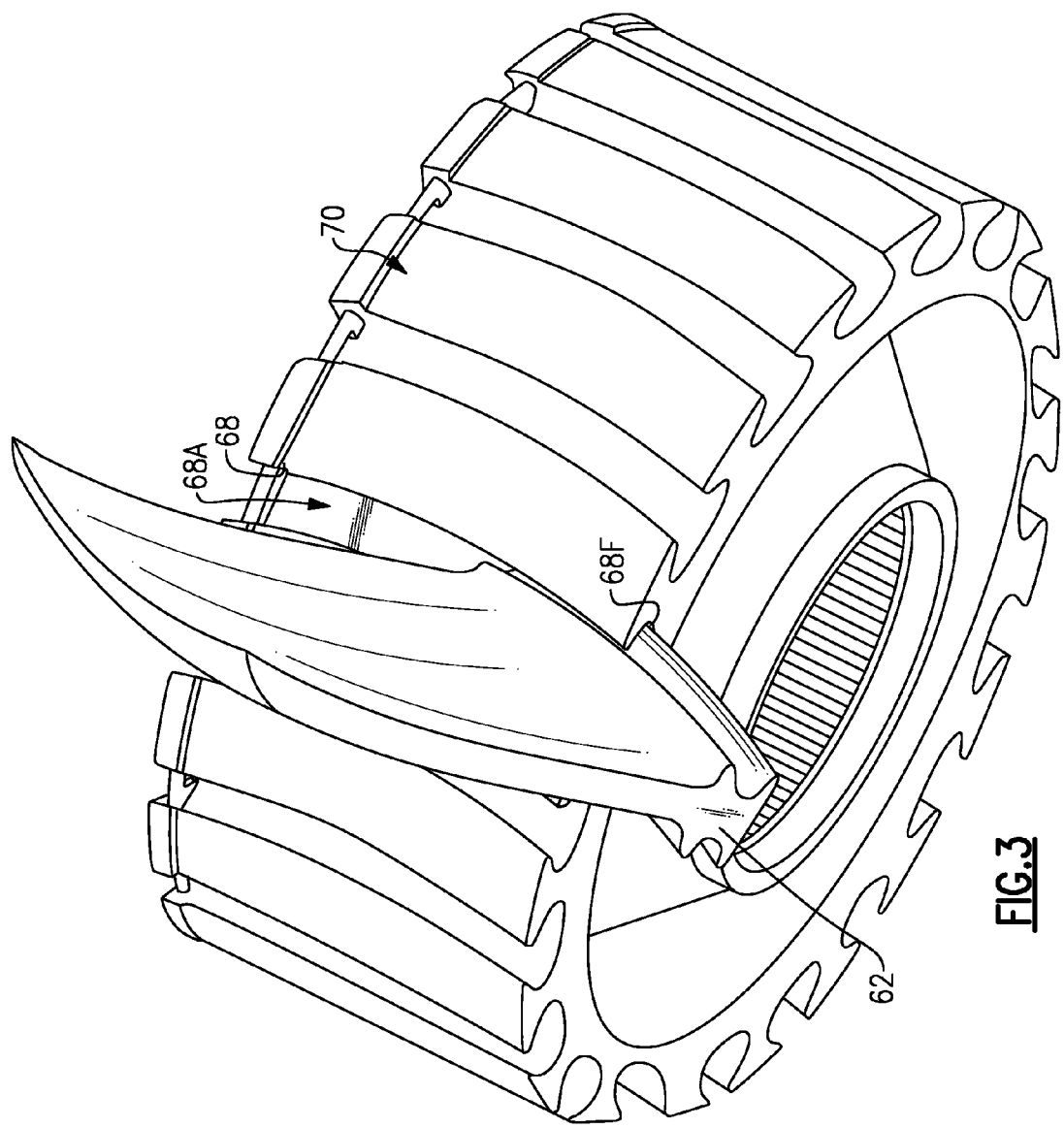
FIG. 3 is an enlarged perspective view of a rotor hub with a blade lock and one blade root partially installed.

Each fan blade 60 generally includes an innermost root portion 62, an intermediate platform portion 64, and an outermost airfoil portion 66. The root portion 60 may define an attachment such as an inverted fir-tree, bulb, or dovetail so the fan blade 60 is slidably received in a complimentary configured blade slot 68 in a fan rotor hub 70 to provide a bladed rotor 72 about axis A. The illustrated blade slots, when viewed radially toward the axis A, have a curved profile. Alternatively, the slots may be linear slots having a linear centerline oriented parallel or oblique to the rotational axis. Each slot 68 includes a forward section 68F and an aft section 68A to accommodate installation and removal of the fan blades 60 in a generally axial direction (FIG. 3). As defined herein, the term "axial" refers not only to a direction strictly parallel to the rotational axis but also to directions somewhat non-parallel to the axis, such as the slotwise direction defined by a curved or linear slot.

Such bladed rotors sometimes require two or more different blades 60A, 60B mounted to the same rotor hub 70 to facilitate, for example, vibration tuning, flutter margin control and/or adjustment of other parameters. To achieve the desired parameters it is imperative that the specific blade 60A, 60B always be mounted at their proper circumferential positions in a mistake-proof manner.

Figure 4:
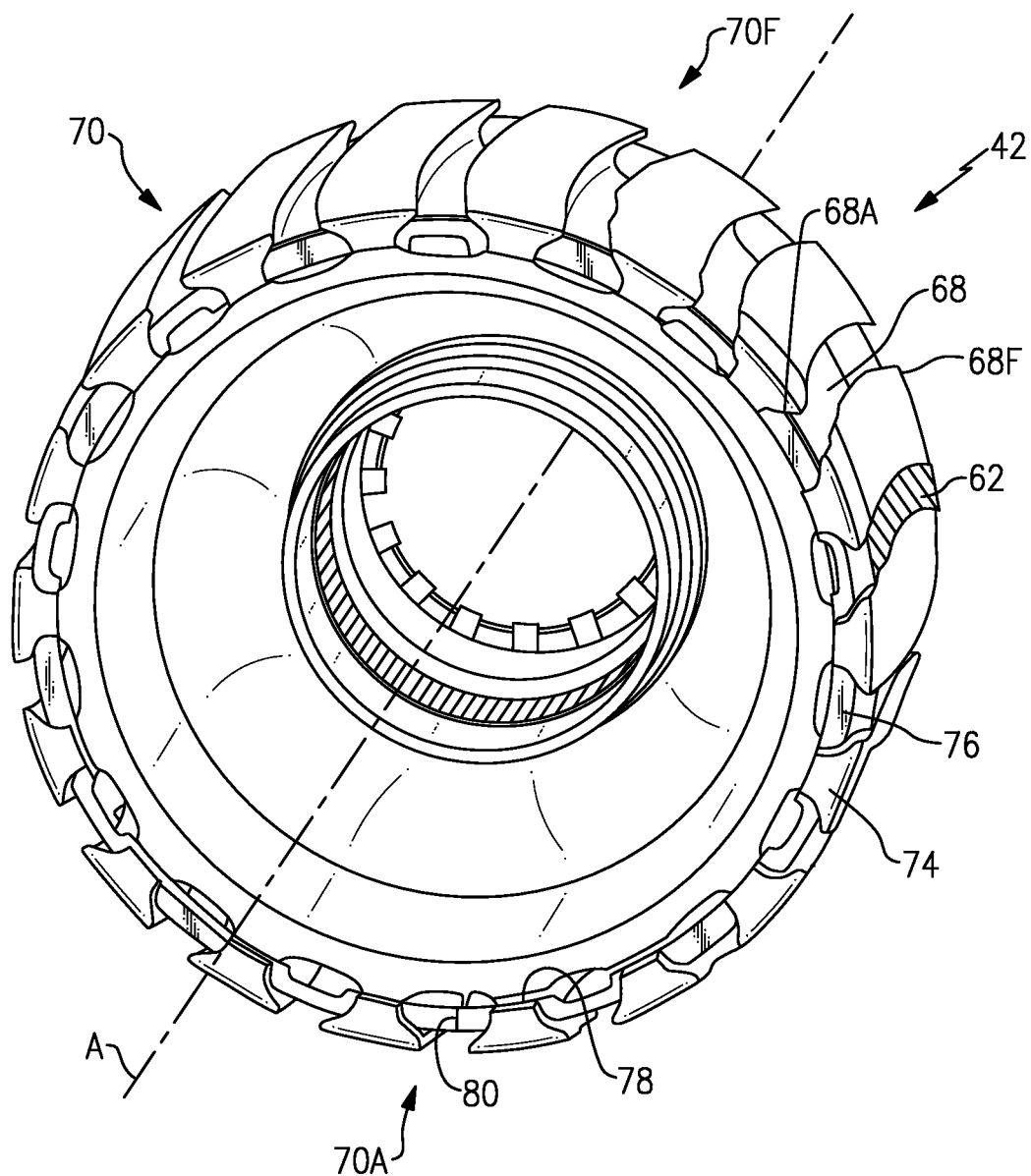
FIG. 4 is a rear perspective view of a rotor hub with a blade lock and one blade root installed.

With reference to FIG. 4, the bladed rotor 72 includes a multiple of lock attachments 74 such as annular hooks which support a blade lock 76 such as a snap ring. The blade lock 76 is received within the multiple of lock attachments 74 along an aft face 70A of the rotor hub 70 to interface with each blade slot 68. The blade lock 76 may be circumferentially continuous except for a split 80 that enables a technician to deflect the blade lock 76 to mount within the multiple of lock attachments 74 as generally known. It should be understood that the bladed rotor 72 is described somewhat generically and that additional hub components such as a bayonet ring, a retainer ring and others may also be provided but need not be described in detail herein.

Figure 5:
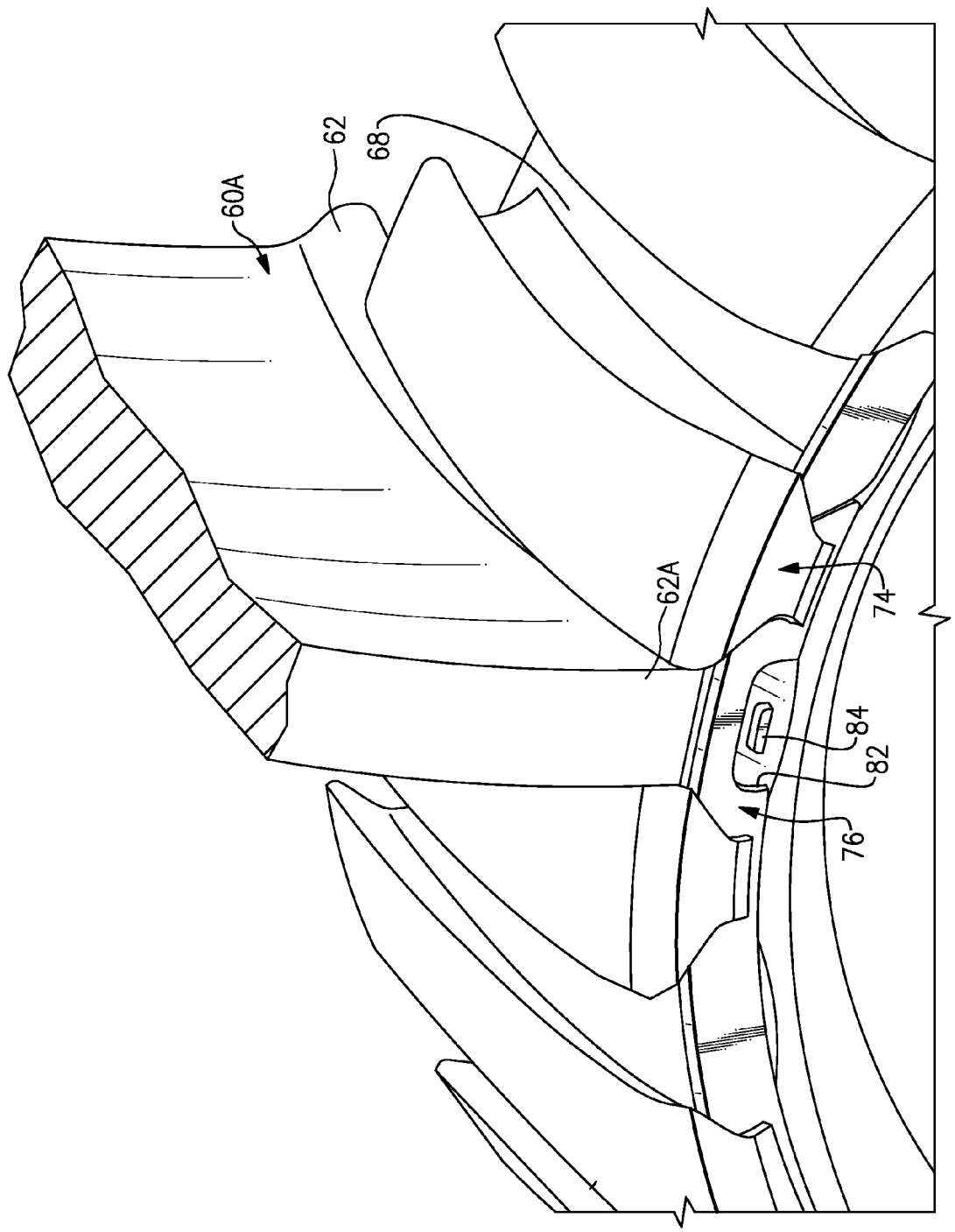
FIG. 5 is a rear enlarged perspective view of a rotor hub showing a blade slot and blade lock according to one non-limiting embodiment with a blade portion in a partially installed position.
Figure 6:
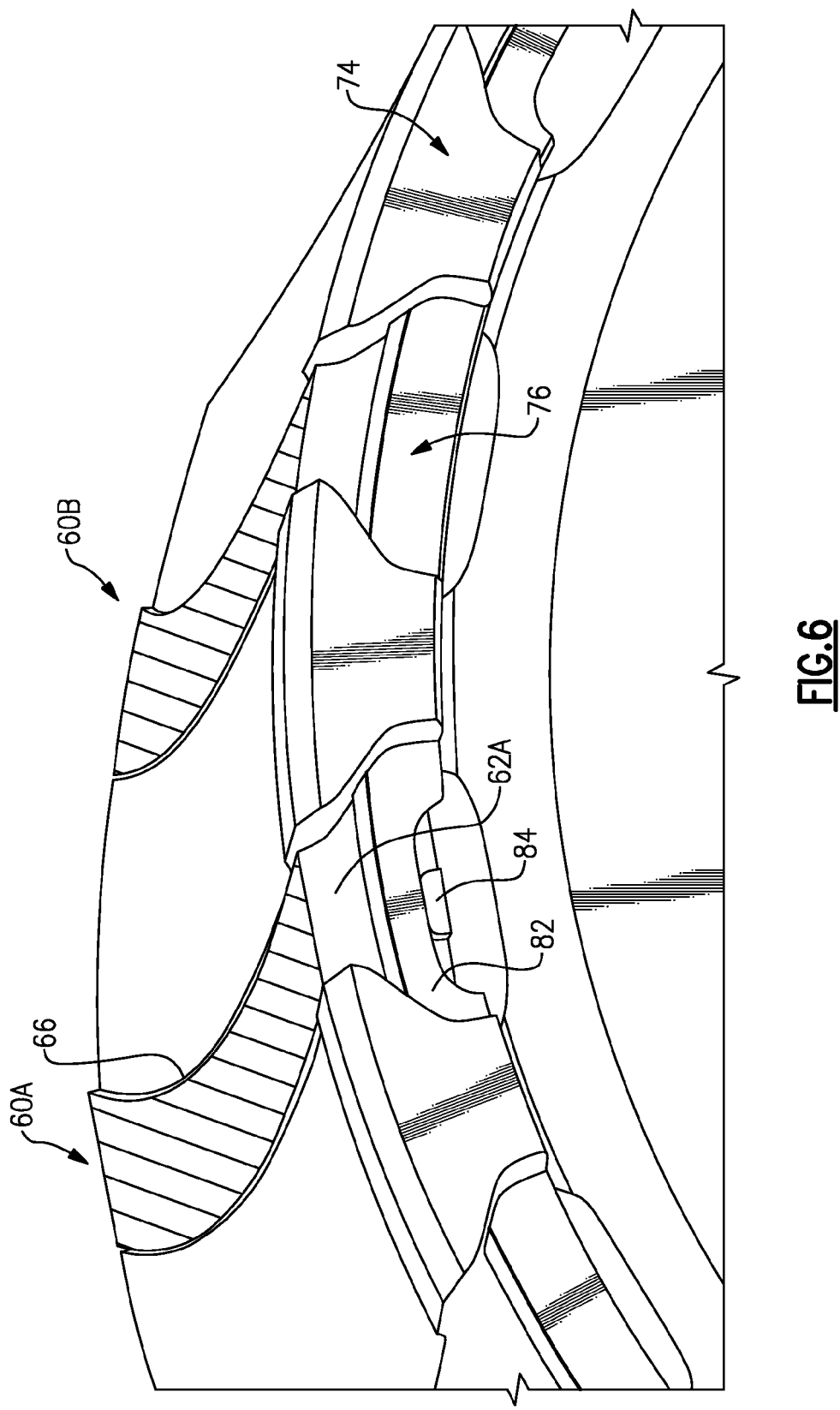
FIG. 6 is a rear enlarged perspective view of a rotor hub showing a blade slot and blade lock with blade portions in an installed position.

With reference to FIG. 5, the blade lock 76 includes at least one interface feature 82 at specific circumferential features with respect to a blade slot 68 to interact with a blade feature 84 and assure that only the desired particular type of blade 60A may be mounted within that associated blade slot 68. That is, the interface feature 82 is circumferentially arranged to align with each blade slot 68 to mount only specific desired blade types such as blade 60A (FIG. 6). The remainder of the blade slots 68 will receive, for example, blades 60B.

The interface feature 82A (FIG. 7) and the blade feature 84A are complementary features such as a slot in the blade lock 76 which receives a key which extends from the root portion 62 of blade 60A. The key may be positioned to extend from an aft axial end section 62A of the root portion 62.

Even though each of the blade slots 68 are equivalent, the disclosed interface permits only blade 60A to fit into the appropriate blade slot 68 adjacent to the interface feature 82 and prevents the blade 60B from being mounted into a blade slot 68 which is not adjacent to that interface feature. For example, if blade 60A is installed in a blade slot 68 which is intended for blade 60B, the key will not fit the slot, and the blade 60A cannot be fully installed in the axial direction to thereby prevent installation of a front blade lock (not shown) which would halt installation until all blades 60A, 60B are positioned at their correct locations. A mistake-proof interface is thereby provided.

It should be understood that other features such as a slot in the blade and a key in the blade lock 74 may alternatively be provided to mistake-proof the installation.

Figure 7:
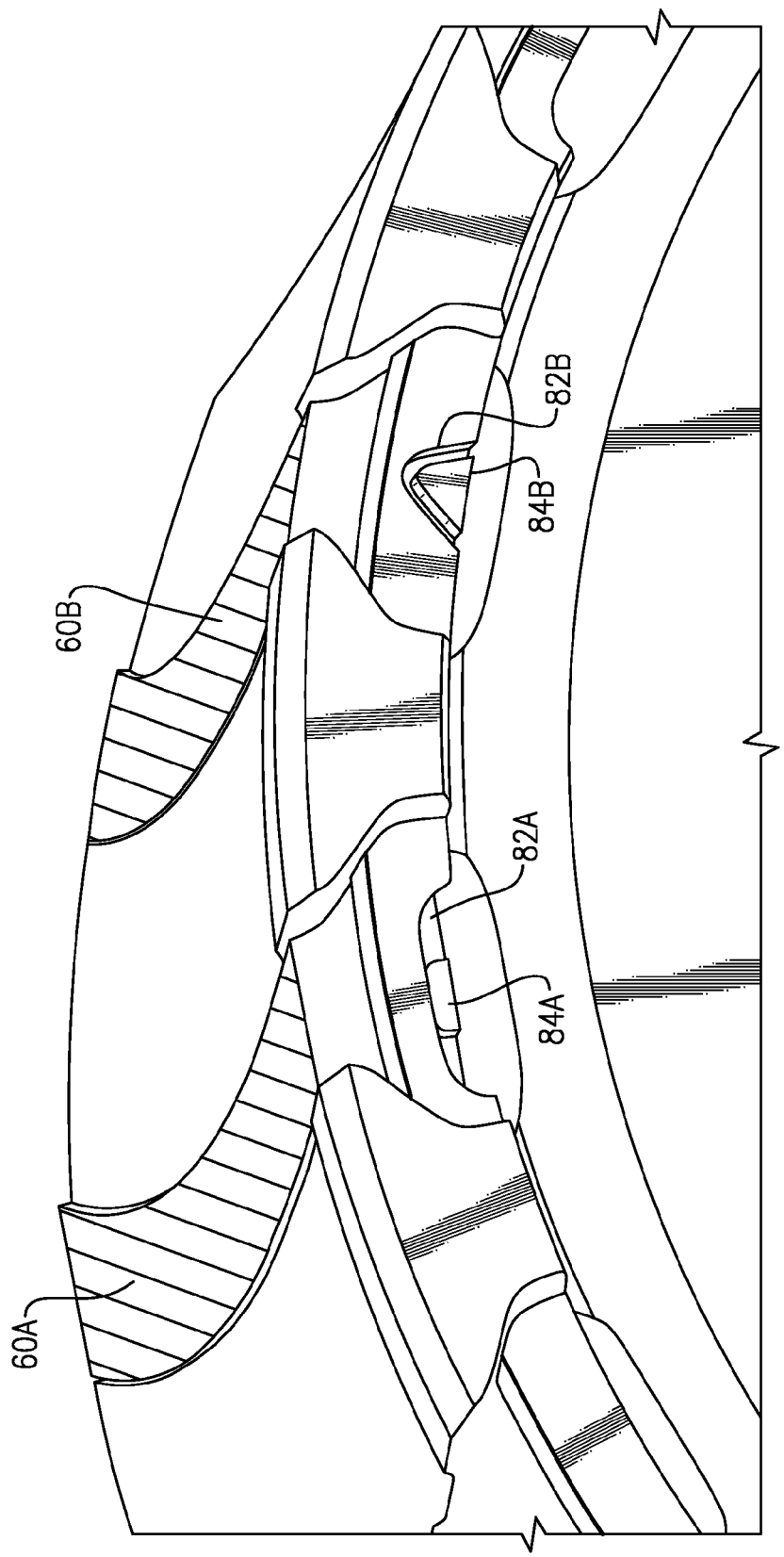
FIG. 7 is a rear enlarged perspective view of a rotor hub showing a blade slot, blade lock, and blade portions according to another non-limiting embodiment.

In yet another non-limiting embodiment, the interface feature 82A, 82B and the blade feature 84A, 84B may be independent and mutually exclusive so that only the single proper blade 60A, 60B may be located in the proper blade slot 68 (FIG. 7). It should be understood that various geometric shapes such as arcuate, rectilinear, triangular, and others may define the interface features 82A, 82B and the blade features 84A, 84B to facilitate a mistake-proof installation.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A bladed rotor comprising:
   a rotor hub which defines a multiple of blade slots;
   a blade lock mountable to said rotor hub, said blade lock includes first and second interface features circumferentially arranged with respect to a first and a second of said multiple of blade slots, respectively; and
   a first rotor blade configured to be axially mounted within said first of said multiple blade slots, said first rotor blade includes a first blade feature that is complimentary with said first interface feature such that said first rotor blade can only fully be received into said first of said multiple of blade slots but not fully received into a remainder of said multiple of blade slots that are not circumferentially arranged with respect to said first interface feature;
   a second rotor blade configured to be axially mounted within said second of said multiple blade slots, said second rotor blade includes a second blade feature that is complimentary with said second interface feature such that said second rotor blade can only fully be received into said second of said multiple of blade slots but not fully received into a remainder of said multiple of blade slots that are not circumferentially arranged with respect to said second interface feature.

2. The bladed rotor as recited in claim 1, wherein said blade lock is a split ring.

3. The bladed rotor as recited in claim 2, wherein at least one of said first and second interface features is a slot.

4. The bladed rotor as recited in claim 3, wherein at least one of said first and second blade features is a key.

5. The bladed rotor as recited in claim 4, wherein said key extends from a blade root of said first rotor blade.

6. The bladed rotor as recited in claim 4, wherein said key extends from an axial end section of a root portion of said first rotor blade.

7. The bladed rotor as recited in claim 1, wherein at least one of said first and second interface features a slot.

8. The bladed rotor as recited in claim 1, wherein at least one of said first and second blade features is a key.

9. The bladed rotor of claim 1, wherein said blade lock is annular.

10. The bladed rotor of claim 1, wherein at least one of said first and second rotor blades includes an attachment configured to be slidably received in said first or said second of said multiple of blade slots, respectively, the attachment being one of an inverted fir-tree, a bulb, and a dovetail.

11. The bladed rotor of claim 1, wherein said blade lock is supported by a multiple of lock attachments, and said multiple of lock attachments are annular hooks.

12. The bladed rotor of claim 11, wherein said blade lock is arranged along an aft side of said rotor hub.

13. The bladed rotor of claim 12, wherein at least one of said first and second interface features are one of a slot or a key receivable in said slot and at least one of said first and second blade features is the other of said slot or key.

14. A bladed rotor comprising:
a rotor hub which defines a multiple of first blade slots and a multiple of second blade slots;
a blade lock mountable to said rotor hub, said blade lock includes a multiple of first interface features each circumferentially arranged with respect to one of said multiple of first blade slots; and
a multiple of first rotor blades configured to be axially mounted within said multiple of first blade slots, said multiple of first rotor blades each including a first blade feature circumferentially arranged with respect to said multiple of first blade slots that is complimentary with said multiple of first interface features such that said multiple of first rotor blades can only be received into said multiple of first blade slots but not fully received into said multiple of second blade slots that are not circumferentially arranged with respect to said at multiple of first interface features; and
a multiple of second rotor blades each including a second blade feature, and a multiple of second interface features on the blade lock each circumferentially arranged with respect to one of said multiple of second blade slots, said multiple of second rotor blades configured to be axially mountable within said multiple of second blade slots by said second blade features interacting with said multiple of second interface features but not within said multiple of first blade slots, but not within said multiple of first blade slots that are not circumferentially arranged with respect to said at multiple of second interface features.

15. The bladed rotor as recited in claim 14, wherein each of said multiple of first interface features is a slot.

16. The bladed rotor as recited in claim 14, wherein each of said multiple of first blade features is a key.

17. The bladed rotor as recited in claim 14, wherein each of said multiple of first blade features is a rectilinear key.

18. The bladed rotor as recited in claim 14, wherein said multiple of first blade slots are identical to said multiple of second blade slots.

19. The bladed rotor as recited in 14, wherein said multiple of first rotor blades are fan blades.

20. The bladed rotor as recited in claim 19, wherein said multiple of second rotor blades are fan blades, said multiple of second rotor blades different than said multiple of first rotor blades.

21. The bladed rotor as recited in claim 14, wherein said multiple of first rotor blades are fan blades.

22. A method of assembling a bladed rotor comprising:
configuring a first rotor blade with a first blade feature to be axially mounted within a first of a multiple of blade slots by providing a first interface feature on a blade lock that is circumferentially arranged with respect to said first of said multiple of blade slots and is complementary with said blade feature such that said first rotor blade can only be received into said first of said multiple of blade slots but not fully received into a remainder of said multiple of blade slots that are not circumferentially arranged with respect to said at least one first interface feature; and
configuring a second rotor blade with a second blade feature to be axially mounted within a second of said multiple of blade slots by providing a second interface feature on said blade lock that is circumferentially arranged with respect to said second of said multiple of blade slots and is complementary with said second blade feature such that said second rotor blade can only be received into said second of said multiple of blade slots but not fully received into a remainder of said multiple of blade slots that are not circumferentially arranged with respect to said at least one second interface feature.

23. The method as recited in 22, further comprising:
axially inserting a key on the first rotor blade at least partially within a slot defined by the blade lock.

24. The method as recited in 22, further comprising:
rotationally positing the blade lock with respect to the multiple of blade slots.

* * * * *